Sept. 4, 1962
W. P. WOOD
3,052,499
CONVERTIBLE SEAT CONSTRUCTION
Filed Aug. 10, 1959
2 Sheets-Sheet 1
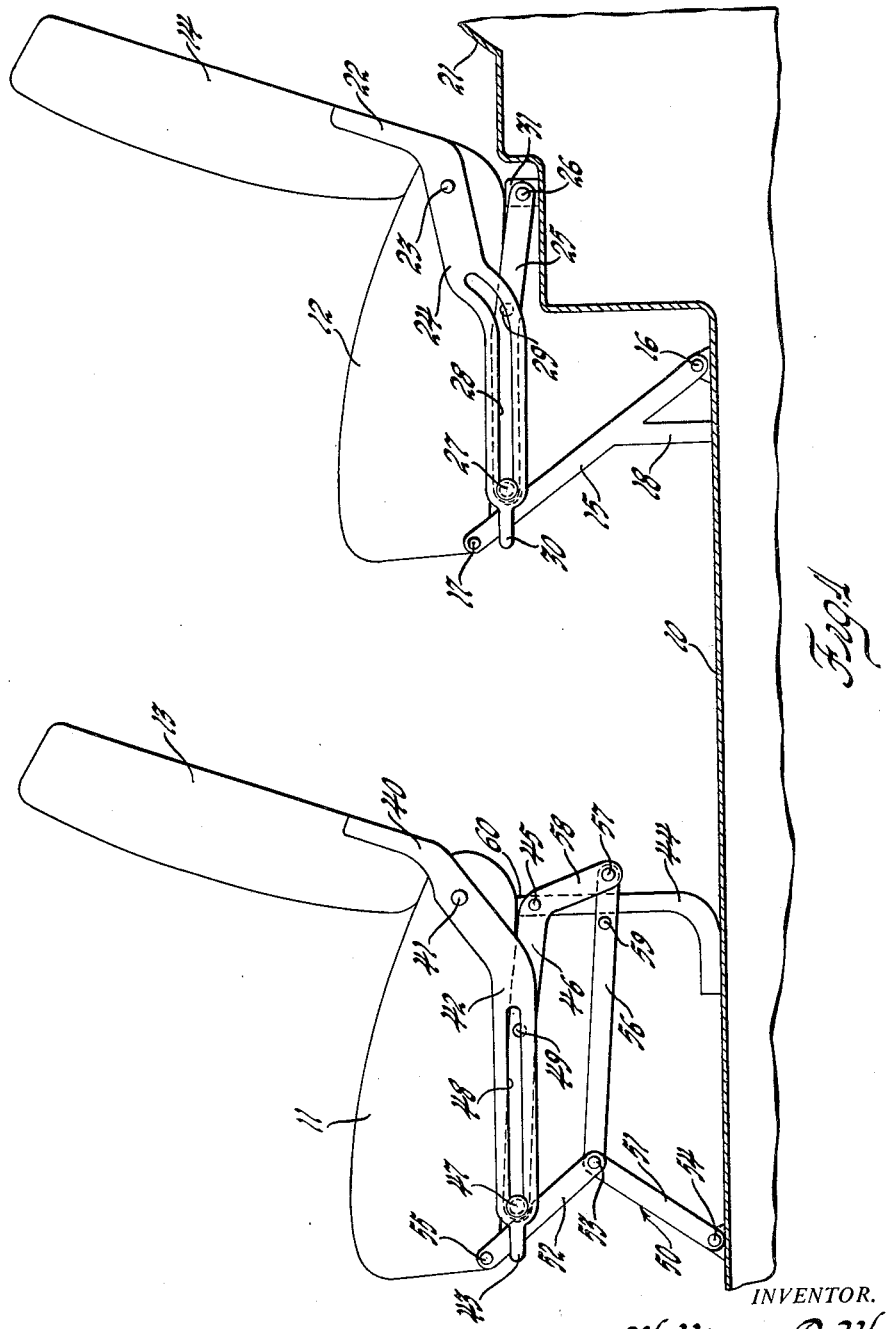
INVENTOR.
BY William P. Wood
E.W. Christen
ATTORNEY

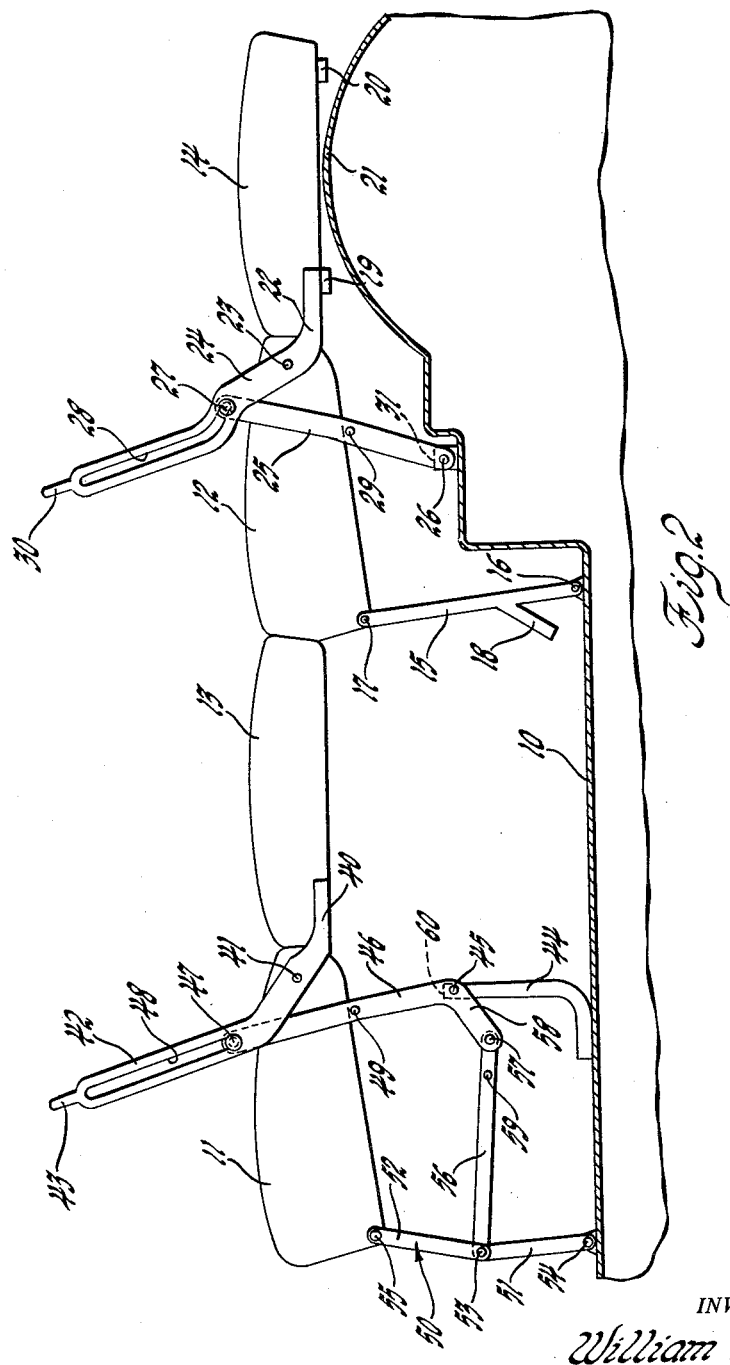

United States Patent Office 3,052,499
Patented Sept. 4, 1962

3,052,499
CONVERTIBLE SEAT CONSTRUCTION
William P. Wood, Royal Oak, Mich., assignor to General Motors Corporation, Detroit, Mich., a corporation of Delaware
Filed Aug. 10, 1959, Ser. No. 832,813
10 Claims. (Cl. 297—64)

This invention relates to convertible seat constructions for vehicles.

The object of the invention is to provide a seat construction with a simple and inexpensive mechanism for converting the bottom and back cushions from seat to bed forming positions.

The invention is particularly useful when incorporated in the front and rear seats of an automobile as both seats will provide a full length bed.

In the drawings:

FIGURE 1 is a side elevation of the front and rear seats of a station wagon with the cushions in the seat forming position, and FIGURE 2 is an elevational view with the cushions in the bed forming position.

Referring now to the drawings, a vehicle body floor 10 is provided with the usual front and rear seats which include bottom cushions 11 and 12 and back cushions 13 and 14. The mechanism for converting the front seat to the front half of the full length bed is a modified version of a simpler mechanism that is used for converting the rear seat so the rear mechanism will be described first. The drawings show the mechanisms for the driver's side of the seat and it is understood that like mechanisms are provided for the opposite side of the seat.

The rear seat has a front leg 15 which has a pivot connection 16 to the body floor 10 and a pivot connection 17 to the front portion of the bottom cushion 12 and the leg is operative to raise such front portion on movement to bed forming position. The leg 15 also has a foot 18 which engages the floor 10 in the seat forming position to limit the forward swinging movement of the leg. The rear seat back cushion 14 rests on stops 19 and 20 above the rear wheel housing 21 when in the bed forming position and has a hinge arm 22 with a pivot connection 23 to the rear portion of the bottom cushion 12. The hinge arm 22 also includes a lever arm portion 24 which projects forwardly of the pivot connection 23 and which is in alignment with the bottom cushion 12 when in the seat forming position. The hinge means raises the front portion and lowers the rear portion of the back cushion 14 during movement to the bed forming position.

A rear leg 25 is operative to raise the rear portion of the bottom cushion 12 on movement to bed forming position and has a pivot connection 26 with the body 10 and a slidable pivot connection 27 with a cam slot 28 formed in the lever arm 24. The rear leg 25 also has a roller pin 29 which engages the underside of the bottom cushion 12 to support the rear portion of the cushion on movement to the bed forming position. The lever arm 24 is provided with a handle 30 which, when raised manually, moves the bottom and back cushions to the bed forming position by means of the force applied to the converting position through the slidable pivot 27 and cam slot 28. The underside of the bottom cushion engages a stop surface 31 when in seat forming position for rigid support.

The converting mechanism for the front seat has similar elements which include a hinge arm 40 on the back cushion 13 with a pivot connection 41 to the bottom cushion 11 and having a lever arm portion 42 with an operating handle 43. A bracket 44 extends from the body floor 10 and has a pivot connection 45 with a rear leg 46 that has a slidable pivot connection 47 with a cam slot 48 in the lever arm 42. The rear leg 46 also has a roller pin 49 to engage the underside of the bottom cushion 11 on movement to bed forming position. The front leg means 50 for the front seat comprises a pair of links 51 and 52 having a pivot connection at 53 and having pivot connections 54 and 55 with the body 10 and forward portion of the bottom cushion 11. A link 56 is pivoted to the front leg means pivot 53 and has a pivot connection 57 with a lower extension 58 of the rear leg 46. The connecting link 56 controls the jackknife action of the front leg means 50 so that the front portion of the bottom cushion 11 raises on movement to bed forming position. The connecting link 56 has a stop pin 59 which engages the bracket 44 when in seat forming position and the bracket 44 has a stop portion 60 to engage the underside of the bottom cushion 11 when in seat forming position whereby the seat is afforded rigid support when in such position. The front back cushion 13 is arranged so that the upper portion thereof compressibly engages the front portion of the rear bottom cushion 12 when the seats are in the bed forming position to provide support for the back cushion 13 when in such position.

While preferred embodiments of the invention have been described in detail, it is understood that various modifications will be apparent to those skilled in the art which may fall within the scope of the claims which follow.

I claim:

1. In a vehicle body having bottom and back cushions movable to seat and bed forming positions, front leg means for the bottom cushion, a hinge arm secured to the back cushion and having a pivot connection with the rear portion of the bottom cushion, the hinge arm having a lever arm integral therewith in projecting relation, said lever arm extending from said pivot connection to a position adjacent the front of the bottom cushion whereby the back cushion may be remotely actuated thereby from in front of the bottom cushion, and a rear leg having a pivot connection with the body and a slidable pivot connection with the lever arm, upward movement of the lever arm serving to move the bottom and back cushions to the bed forming position.

2. In a vehicle body having bottom and back cushions movable to seat and bed forming positions, front leg means having pivot connections with the body and bottom cushion, a hinge arm secured to the bottom portion of the back cushion and having a pivot connection with the rear portion of the bottom cushion, the hinge arm having a projecting lever arm integral therewith, said lever arm extending from said pivot connection to a position adjacent the front of the bottom cushion whereby the back cushion may be remotely actuated thereby from in front of the bottom cushion, and a rear leg having a pivot connection with the body and a slidable pivot connection with the lever arm, upward movement of the lever arm serving to move the bottom and back cushions to the bed forming position.

3. In a vehicle body having bottom and back cushions movable to seat and bed forming positions, front leg means having pivot connections with the body and bottom cushion supporting said bottom cushion on said body, a hinge arm secured to the bottom portion of the back cushion and having a pivot connection with the rear portion of the bottom cushion, the hinge arm having a lever arm secured thereto that projects forwardly of the hinge pivot connection and that is in alignment with the bottom cushion when in seat forming position, and extends to a position adjacent the front of the bottom cushion whereat the back cushion may be remotely actuated thereby from in front of the bottom cushion, and a rear leg having a pivot connection with the body and a slidable pivot connection with the lever arm, upward movement of the lever arm from alignment with the bottom cushion serving to move the bottom and back cushions to the bed forming position.

4. In a vehicle body having bottom and back cushions movable to seat and bed forming positions, front leg means having pivot connections with the body and bottom cushion supporting said bottom cushion on said body and the vertical height of said front leg means being extendable by movement about the pivot connection with said body to raise the front portion of the bottom cushion on movement to bed forming position, a hinge arm secured to the bottom portion of the back cushion and having a pivot connection with the rear portion of the bottom cushion, said pivot connection being located to raise the front portion and lower the rear portion of the back cushion on movement to bed forming position, the hinge arm having a lever arm secured thereto that projects forwardly of the hinge pivot connection and that is in alignment with the bottom cushion when in seat forming position and extends from said pivot connection to a position adjacent the front of the bottom cushion whereby the back cushion may be remotely actuated from in front of the bottom cushion, and a rear leg having a pivot connection with the body and a slidable pivot connection with the lever arm and the vertical height of said rear leg being extendable by movement about the pivot connection with said body to raise the rear portion of the bottom cushion on movement to bed forming position, upward movement of the lever arm from alignment with the bottom cushion serving to move the bottom and back cushions to the bed forming position.

5. In a vehicle body having bottom and back cushions movable to seat and bed forming positions, front leg means comprising an upper link having a pivot connection with the bottom cushion and a lower link having a pivot connection with the upper link and having a pivot connection with the body, the front leg means being operative to raise the front portion of the bottom cushion on movement to bed forming position, a hinge arm secured to the bottom portion of the back cushion and having a pivot connection with the rear portion of the bottom cushion and operative to raise the front portion and lower the rear portion of the back cushion on movement to bed forming position, the hinge arm having a lever arm secured thereto that projects forwardly of the hinge pivot connection and that is in alignment with the bottom cushion when in seat forming position, a rear leg having a pivot connection with the body and a slidable pivot connection with the lever arm and operative to raise the rear portion of the bottom cushion on movement to bed forming position, and a link having pivot connections with the rear leg and front leg means, upward movement of the lever arm from alignment with the bottom cushion serving to move the bottom and back cushions to the bed forming position.

6. In a vehicle seat movable from a seat-forming position to a bed-forming position, a seat back, a seat cushion, seat support linkage movable between a lower seat-forming position and an upwardly displaced bed-forming position, a seat position control arm, one end of said control arm being fixed to said seat back, a pivotal connection between said control arm and said seat cushion, a slidable pivotal connection between said control arm and said linkage, the other end of said control arm extending from said pivotal connection to a position adjacent the front of said seat cushion, handle means formed on the other end of said control arm whereby said seat back may be remotely actuated from in front of said seat cushion, and said control arm being actuable by said handle means to move said seat back downwardly about said pivotal connection and to move said linkage upwardly by sliding pivotal movement relative to said control arm to move said seat to said bed-forming position.

7. In combination in a vehicle having spaced front and rear seats movable from seat-forming positions to a bed-forming position, each of said seats comprising a seat cushion and a seat back, each of said seats having seat support linkage movable between a lower seat-forming position and an upwardly displaced bed-forming position, an integral control arm for actuating said linkage between said lower seat-forming position and said upwardly displaced bed-forming position, one end of said control arm being fixed to said seat back, a pivotal connection between said control arm and said seat cushion, a slidable pivotal connection between said control arm and said linkage, the other end of said control arm extending from said pivotal connection to a position adjacent the front of said seat cushion, handle means formed on the other end of said control arm whereby said seat back may be remotely actuated from in front of said seat cushion, said control arm being actuable by said handle means to move said seat back downwardly about said pivotal connection and to move said linkage upwardly by sliding pivotal movement relative to said control arm to move said seats into said bed-forming position.

8. The apparatus as defined in claim 7 and wherein the front seat is spaced from the rear seat so that the front seat back is in abutting and supporting engagement with the rear seat cushion in said bed-forming position.

9. Seat structure movable from a seat-forming position to a flat bed-forming position and comprising a seat cushion and a separate seat back, a front pivotal support link pivotally connected to the front of said seat cushion and to support means located beneath said seat cushion, an integral hinge arm, one end of said hinge arm being connected to said seat back, pivotal means connecting said hinge arm to said seat cushion to permit pivotal movement of said seat back relative to said seat cushion, a control handle formed on the other end of said hinge arm and extending forwardly from said pivot means to a position closely adjacent the front of said seat cushion, slot means forward in said hinge arm and extending between said control handle and said pivot means, a rear pivotal support link pivotally connected at one end to support means located beneath said seat cushion, a pivotal connection formed on the other end of said support link and slidably received within said slot, and said slot being contoured to guide said seat back during movement from said seat-forming position to said bed-forming position by rotation of said hinge arm about said pivotal means through application of force on said control handle.

10. Seat structure movable from a seat-forming position to a flat bed-forming position and comprising a seat cushion and a separate seat back, a front pivotal support link pivotally connected to the front portion of said seat cushion and to support means located beneath said seat cushion, said front pivotal support link extending rearwardly and downwardly from said seat cushion to said support means in said seat forming position, an integral hinge arm, one end of said hinge arm being connected to said seat back at the lower end thereof, pivotal means connecting said hinge arm to a rear portion of said seat cushion for pivotal movement of said seat back relative to said seat cushion between said seat-forming and said bed-forming position, a seat positioning control handle formed on the other end of said hinge arm and extending forwardly from said pivot means to a position adjacent the front of said seat cushion in said seat-forming position, a rear pivotal support link pivotally connected at one end to support means located beneath said seat cushion, a pivotal connection formed on the other end of said rear pivotal support link, slot means formed in said hinge arm and extending between said pivotal means and said control handle, said pivotal connection being slidably received in said slot, cam means secured to said rear pivotal link between said pivotal connection and the pivotal connection to said support means, said cam means being engaged with said seat cushion in said seat-forming position and said bed-forming position and during movement therebetween to guide said seat cushion from one position to the other, and said rear pivotal link and said cam means being controllably movable by sliding movement of said pivotal connection in said slot as said hinge arm is actuated about said pivot means through force application to said control handle to move said seat cushion upwardly and rearwardly by corresponding movement of said pivotal link and to move said seat back rearwardly and downwardly about said pivot means to the bed-forming position.

References Cited in the file of this patent

UNITED STATES PATENTS

| | | |
|---|---|---|
| 2,279,286 | Bell | Apr. 7, 1942 |
| 2,629,425 | James | Feb. 24, 1953 |
| 2,859,798 | Carte | Nov. 11, 1958 |

FOREIGN PATENTS

| | | |
|---|---|---|
| 593,283 | Great Britain | Oct. 13, 1947 |
| 1,193,132 | France | Apr. 27, 1959 |

UNITED STATES PATENT OFFICE
CERTIFICATE OF CORRECTION

Patent No. 3,052,499 September 4, 1962

William P. Wood

It is hereby certified that error appears in the above numbered patent requiring correction and that the said Letters Patent should read as corrected below.

Column 4, line 38, for "forward" read -- formed --.

Signed and sealed this 15th day of January 1963.

(SEAL)
Attest:

ERNEST W. SWIDER
Attesting Officer

DAVID L. LADD
Commissioner of Patents